US012234138B1

(12) United States Patent
Groarke

(10) Patent No.: US 12,234,138 B1
(45) Date of Patent: Feb. 25, 2025

(54) BEVERAGE CAN OPENING DEVICE

(71) Applicant: Patrick Groarke, Rockville Centre, NY (US)

(72) Inventor: Patrick Groarke, Rockville Centre, NY (US)

( * ) Notice: Subject to any disclaimer, the term of this patent is extended or adjusted under 35 U.S.C. 154(b) by 302 days.

(21) Appl. No.: 17/879,190

(22) Filed: Aug. 2, 2022

Related U.S. Application Data

(60) Provisional application No. 63/279,066, filed on Nov. 12, 2021.

(51) Int. Cl.
*B67B 7/40* (2006.01)

(52) U.S. Cl.
CPC .................................... *B67B 7/403* (2013.01)

(58) Field of Classification Search
CPC .......................... B67B 7/403; B67B 2007/166
See application file for complete search history.

(56) References Cited

U.S. PATENT DOCUMENTS

| | | | | |
|---|---|---|---|---|
| 1,578,627 A * | 3/1926 | Baumgarten | B67B 7/16 D8/18 |
| 3,495,284 A * | 2/1970 | Weingardt | B67B 7/16 7/152 |
| 4,524,646 A | 6/1985 | Kimberlain | |
| 4,667,544 A * | 5/1987 | Milo | B67B 7/44 81/3.55 |
| 4,681,358 A | 6/1987 | Smith | |
| D291,050 S * | 7/1987 | McIntire | D8/18 |
| D292,499 S * | 10/1987 | Eddy | D8/40 |
| 4,712,454 A | 12/1987 | Hull | |
| 4,774,859 A | 10/1988 | Jarvis | |
| 4,825,728 A * | 5/1989 | Mitchell | B67B 7/403 81/3.55 |
| 4,873,896 A | 10/1989 | Hull | |

(Continued)

FOREIGN PATENT DOCUMENTS

| | | |
|---|---|---|
| JP | 2000238893 A | 9/2000 |
| JP | 2009154947 A | 7/2009 |

OTHER PUBLICATIONS

Juztec Spinner Ring for Men, 2020, available at: www.amazon.com/Juztec-Spinner-Stainless-Titanium-Fashion/dp/B08D9Q9445.

(Continued)

*Primary Examiner* — David B. Thomas
(74) *Attorney, Agent, or Firm* — Thomas A. O'Rourke; James Bargiorno; O'Rourke IP Law, PLLC

(57) ABSTRACT

A ring is wearable on a finger as jewelry, and usable as an opener for a stay-on tab of a can. The ring includes: concentric annular inner and outer surfaces defining a ring shape; a leveraging protrusion; and a trapping protrusion. The leveraging protrusion protrudes away from the annular outer surface and terminates in a substantially flat surface being parallel to the axis. The trapping protrusion protrudes away from a portion of a long edge of the substantially flat surface, and includes: an angled surface and a presentation surface. The presentation surface is parallel to the axis and provides an aesthetic surface. The angled surface is formed adjacent to the substantially flat surface at an acute angle, thereby forming a v-shaped recess configured to receive and engage the stay-on tab. The leveraging protrusion protrudes a distance away from the outer surface to create leverage to pivot the stay-on tab.

3 Claims, 16 Drawing Sheets

(56) References Cited

U.S. PATENT DOCUMENTS

| | | | | | |
|---|---|---|---|---|---|
| 5,029,495 | A * | 7/1991 | Rosenberger | A44C 9/0053 | 81/3.55 |
| 5,347,890 | A * | 9/1994 | Rufkahr | B67B 7/403 | 81/3.55 |
| D454,765 | S * | 3/2002 | Jansson | D8/40 | |
| 6,742,414 | B1 * | 6/2004 | Brailsford | B67B 7/16 | 81/3.4 |
| 6,786,113 | B2 * | 9/2004 | Brailsford | B67B 7/403 | 81/3.4 |
| 7,143,666 | B1 * | 12/2006 | Gutierrez | B67B 7/16 | D8/40 |
| 7,966,910 | B1 * | 6/2011 | Cece | B67B 7/16 | D8/40 |
| 2002/0189406 | A1 * | 12/2002 | Hahn | B67B 7/16 | 81/3.55 |
| 2008/0098853 | A1 * | 5/2008 | Choate | B67B 7/44 | 220/703 |
| 2010/0212458 | A1 * | 8/2010 | Wegener | B67B 7/16 | 81/3.55 |
| 2020/0039806 | A1 * | 2/2020 | Miller | B67B 7/40 | |

OTHER PUBLICATIONS

JAJAFOOK Unique Design Bottle Opener Men's Ring Band Statement Featured Jewelry, 2017, available at: www.amazon.com/JAJAFOOK-Statement-Featured-Jewelry-Fathers/dp/B0794MYV8M/ref=sr_1_1_sspa?keywords=ring%2Bbottle%2Bopener&qid=1658764273&sr=8-1-spons&smid=A3QZYSF6H18KJ.

* cited by examiner

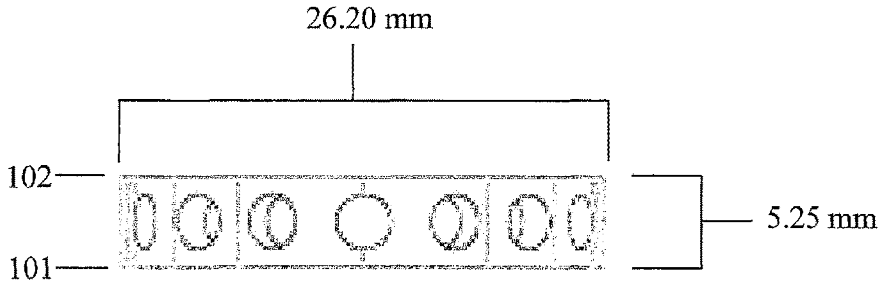
FIG. 17
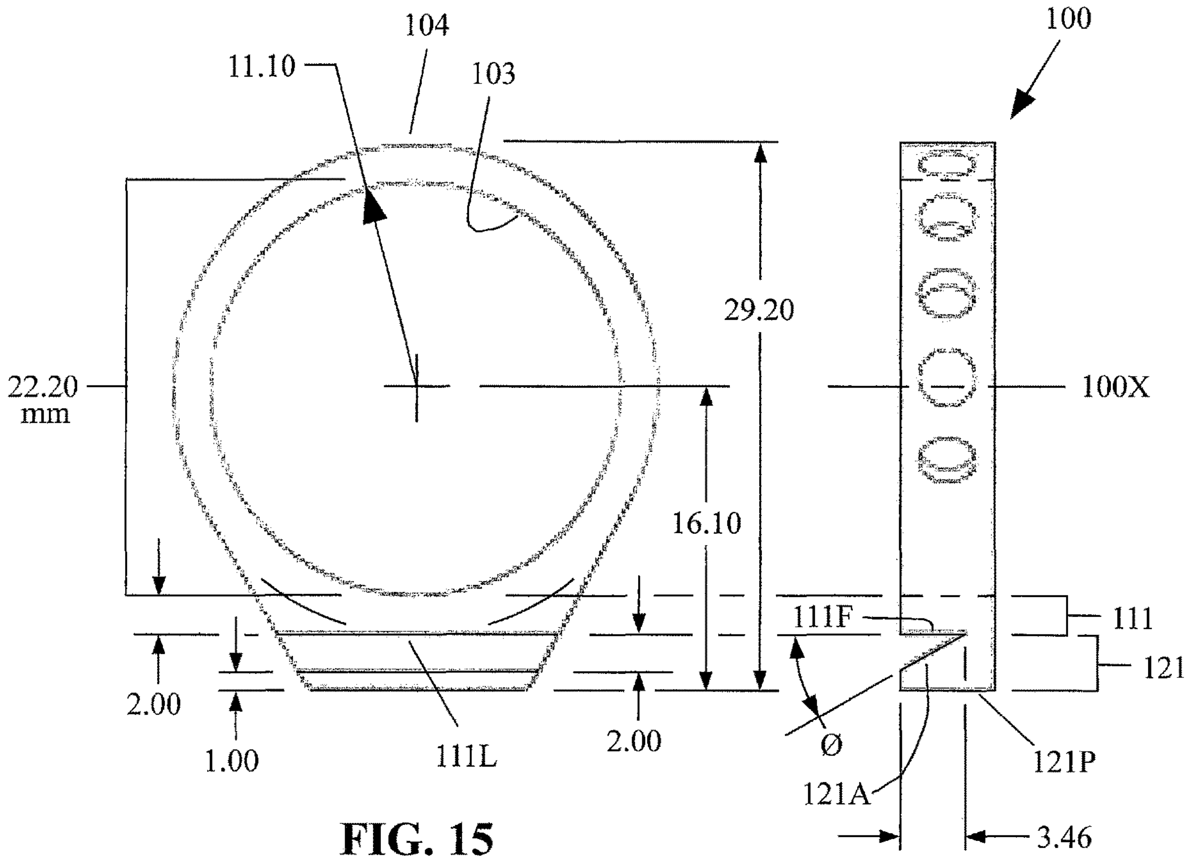
FIG. 15
(Exemplary Dimensions for Ring size 13)
FIG. 16

BEVERAGE CAN OPENING DEVICE

CROSS REFERENCES TO RELATED APPLICATIONS

This application claims priority on U.S. Provisional Application Ser. No. 63/279,066, filed on Nov. 12, 2021, the disclosures of which are incorporated herein by reference.

FIELD OF THE INVENTION

The present disclosure relates to a metal beverage can opening device, being in the form of a ring that may be worn on the user's finger, and which in addition to being ornate is adapted to more easily and efficiently pivot open the stay-on tab of a canned beverage, and which also eliminates the potential for harm to the individual's finger or fingernail.

BACKGROUND OF THE INVENTION

The use of cans for the packaging of beverages, e.g., beer and soda, began around 1930. One of the first to be used were the so-called flat top cans, which required a special opener known as a "churchkey."

In 1959, Ermal Fraze, who owned a tool and die manufacturing company, was at a picnic and was without a churchkey, so he used a car bumper to open a beer can, but challenged himself to find a better alternative. Many inventors developed various different self-opening cans, each of which were not commercially viable—they failed too often. Ermal Fraze developed the pull-top can, which included a ring that could be lifted and used to remove a tab that was formed by scoring the top, the removal of which created an opening for dispensing/drinking of the contents of the can. See e.g., U.S. Design Pat. No. D202,939; U.S. Pat. Nos. 3,349,949; 3,401,823.

The pull-top can was quickly adopted by the beverage industry. However, because the pull-tops were routinely inserted into the can and became a choking hazard during consumption of the beverage, and because the sharp-edged pull-tops were also often discarded on the ground and created hazardous litter, the stay-top was developed. See e.g., U.S. Pat. No. 244,915 to Cudzik.

The stay-top can for beverages is still used prolifically today.

However, as convenient as the stay-top can is by eliminating the need for a conventional can opener, they nonetheless pose problems for different users. Many women have difficulty initially pivoting the stay top, as it tends to break the lady's fingernails, which is especially problematic for the women that have neatly manicured nails (i.e., professionally polished and finished). Also, for some users, the force needed to initially pivot the top can hurt or even cause injury to the person's finger tips, and many elderly people furthermore lack the necessary physical strength to even pivot the stay-top. The lack of a useful tool can lead some to also use their teeth to open the stay-top, risking damage to those teeth.

Some devices/tools that have been developed and may be related, and which are not admitted herein to be prior art to the herein disclosed beverage can opening ring, may be shown by the following.

Japanese Patent No. JP2000238893A for a "Pull-Tab Opener."

Japanese Patent No. JP2009154947A for a "Cap Opening Tool."

U.S. Pat. No. 4,712,454 to Hull for "Lift Tab Container Opener."

U.S. Pat. No. 4,873,896 to Hull for "Lift Tab Container Opener."

U.S. Pat. No. 4,524,646 to Kimberlain for "Tab Can Opening Tool."

U.S. Pat. No. 4,681,358 to Smith for "Container Opening Technology."

U.S. Pat. No. 4,774,859 to Jarvis for "Opener for Tab Top Container."

It is noted that the citing of any reference within this disclosure, i.e., any patents, published patent applications, and non-patent literature, is not an admission regarding a determination as to its availability as prior art with respect to the herein disclosed and claimed method/apparatus.

The herein disclosed apparatus provides improvements upon certain prior art devices/tools.

OBJECTS OF THE INVENTION

It is an object of the invention to provide a tool that can be manipulated by a user to pivot and open the stay-top of a beverage can.

It is another object of the invention to provide a tool that can be worn on a finger of a hand and be manipulated to open the stay-top of a beverage can.

It is a further object of the invention to provide a ring that may be ornate and worn as jewelry, and which may also include a tool portion that can be used to open the stay-top of a beverage can.

It is another object of the invention to provide a ring that may be worn on a finger and which may provide leverage that can be applied to easily open the stay-top of a beverage can.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the disclosed apparatus, a ring may be configured to be worn on a user's finger as jewelry, and the ring may be further configured as an opener for a stay-on tab of a beverage can. The ring may be particularly formed, and may include: an annular inner surface, and an annular outer surface formed concentric with respect to an axis of the annular inner surface, such that the annular inner surface and the annular outer surface define a ring shape. The ring shape may be configured to extend from a first substantially flat side to a second substantially flat (planar) side/end (i.e., being a portion of a hollow cylinder), or alternatively, the ring may terminate in curved ends that may be more ornate.

The ring may also include a leveraging protrusion and a trapping protrusion.

The leveraging protrusion may be configured to protrude from the annular outer surface of the ring shape in a direction being away from the axis, and may be configured to terminate in a substantially flat surface.

The trapping protrusion may be configured to protrude away from a portion of the leveraging protrusion, along a length of a long edge of the substantially flat rectangular surface. The trapping protrusion may include: an angled surface and a presentation surface. The presentation surface may be formed to provide an aesthetically appealing surface for the ring, which may be curved, or may be a substantially flat surface, or may be intricately carved/formed. Using a substantially flat rectangular surface for the presentation surface that is parallel to the axis of the ring shape may be more advantageous for operation of the ring when being used to open the stay-top of a beverage can. The angled surface may be formed adjacent to the substantially flat rectangular surface of the leveraging protrusion, and may be oriented at an acute angle with respect to the substantially flat rectangular surface of the leveraging protrusion. Therefore, a v-shaped recess may be formed by the angled surface of the trapping protrusion and by the substantially flat rectangular surface of the leveraging protrusion, such that it is configured to receive and engage the stay-on tab when the ring is mounted to the finger of the wearer.

The leveraging protrusion is configured to protrude a distance away from the outer surface to create leverage that may be used by a wearer, e.g., and elderly user, to flip open the stay-on tab. The leveraging protrusion is configured to protrude a distance away from the annular outer surface being in the range of fifteen percent to twenty percent of the outer diameter of the annular outer surface of the ring shape, to create suitable leverage.

BRIEF DESCRIPTION OF THE DRAWINGS

The description of the various example embodiments is explained in conjunction with appended drawings, in which:

FIGS. 15, 16, and 17 are a bottom view, a rear view, and a side view of the beverage can opening ring of FIG. 1, shown with exemplary dimensions for a ring size of 13.

DETAILED DESCRIPTION OF THE INVENTION

Figure 1:
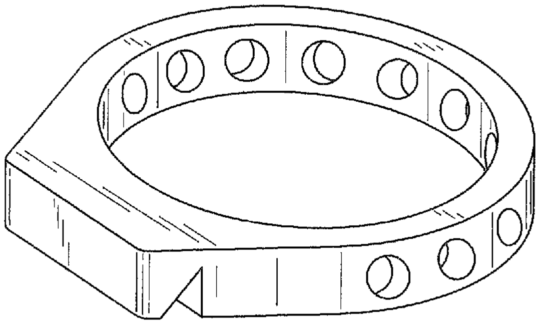
FIG. 1 is a first perspective view of a beverage can opening ring.
Figure 2:
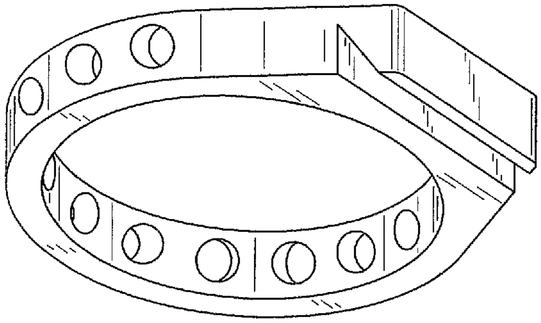
FIG. 2 is a second perspective view of the beverage can opening ring of FIG. 1.
Figure 3:
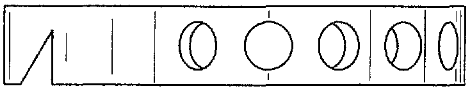
FIG. 3 is a first side view of the beverage can opening ring of FIG. 1.
Figure 4:
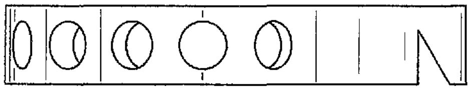
FIG. 4 is a second side view of the beverage can opening ring of FIG. 1.
Figure 5:
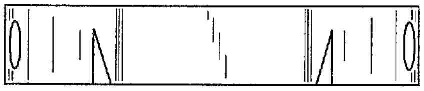
FIG. 5 is a front view of the beverage can opening ring of FIG. 1.
Figure 6:
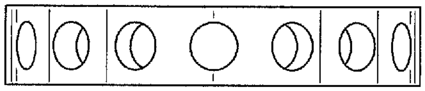
FIG. 6 is a rear view of the beverage can opening ring of FIG. 1.
Figure 7:
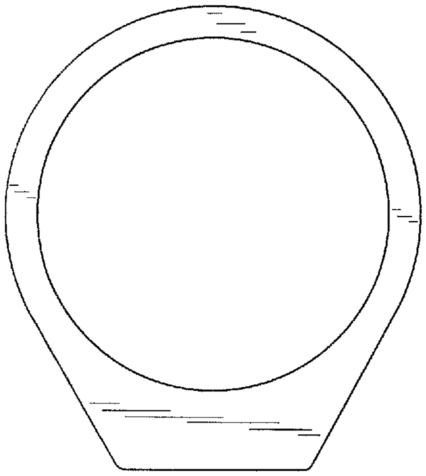
FIG. 7 is a top view of the beverage can opening ring of FIG. 1.
Figure 8:
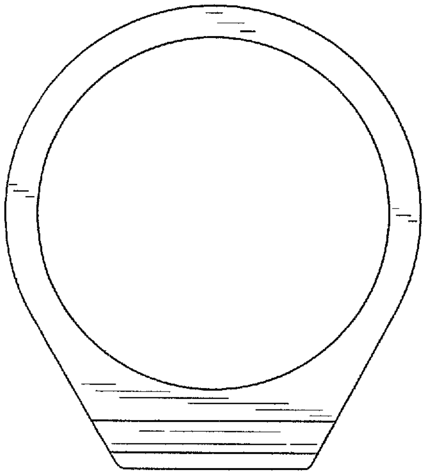
FIG. 8 is a bottom view of the beverage can opening ring of FIG. 1.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with design variations described in the specification, as well as applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Similarly, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 9A:
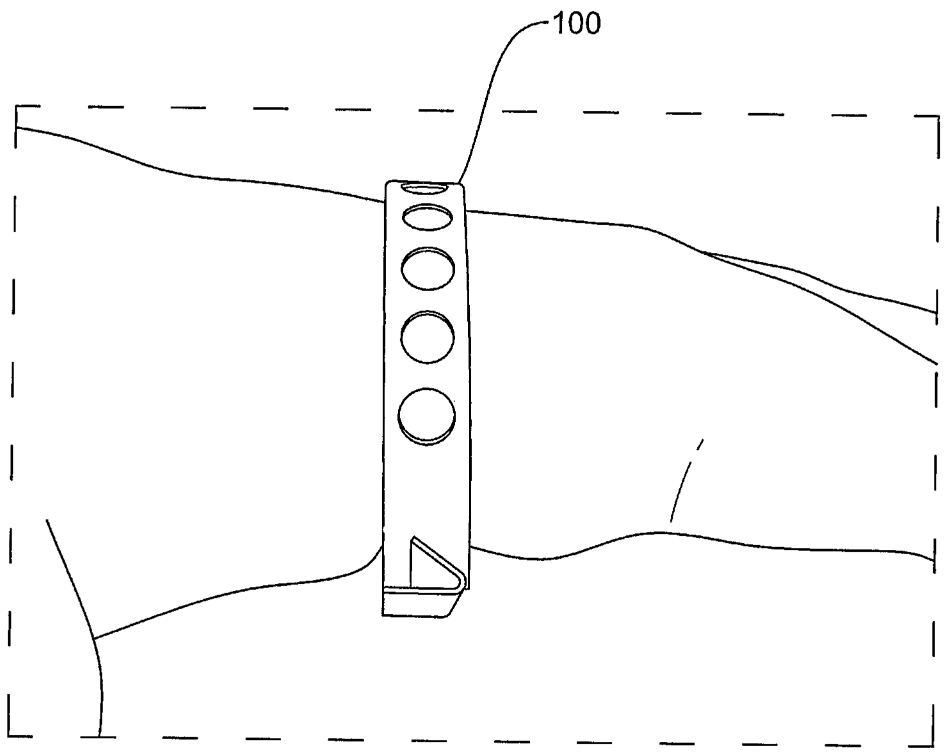
FIG. 9A is a first perspective view showing the beverage can opening ring of FIG. 1 after being mounted on the finger of a user to face in a first direction.
Figure 9B:
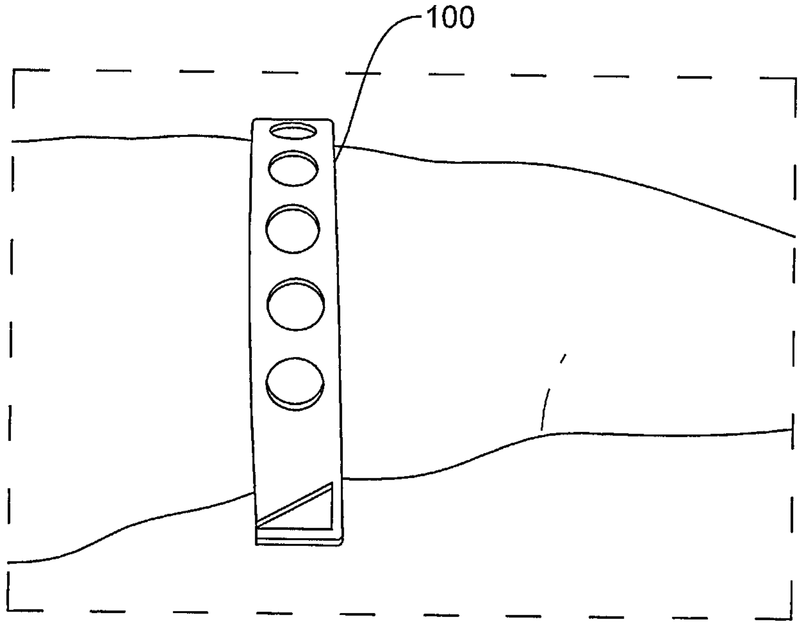
FIG. 9B is a second perspective view showing the beverage can opening ring of FIG. 1 after being mounted on the finger of a user to face in a second direction.

In accordance with at least one embodiment of the herein disclosed apparatus, a ring 100 may be configured to be worn on a user's finger as jewelry (see FIGS. 9A-10), and the ring may be further configured for use as an opener tool for pivoting/opening of a stay-on tab 98 (or other similar tab) of a beverage can 99 (see FIGS. 11-14).

The ring 100 may be particularly formed, and as seen at least in FIG. 1 and FIG. 15, it may include: an annular inner surface 103, and an annular outer surface 104 formed concentric with respect to an axis 100X of the annular inner surface, such that the annular inner surface and the annular outer surface define a ring shape.

The ring shape may be configured to extend between a first substantially flat (planar) side 101 and a second substantially flat (planar) side/end 102 which may be parallel, forming a portion of a hollow cylinder. Alternatively, the ring may terminate in curved ends that may be more ornate, rather than simply being planar.

The ring 100 may also include a leveraging protrusion 111 (FIG. 16) and a trapping protrusion 121.

The leveraging protrusion 111 may be configured to protrude from the annular outer surface 104 of the ring shape in a direction being away from the axis 100X (i.e., radially outward from the annular outer surface), and may be configured to terminate in a substantially flat surface 111F, which may be rectangular or some other shape. The substantially flat surface 111F may be formed to be parallel to the axis 100X.

The trapping protrusion 121 may be configured to protrude away from a portion of the leveraging protrusion 111, along a length 111L of a long edge of the substantially flat rectangular surface. The trapping protrusion 121 may include: an angled surface 121A and a presentation surface 121P. The presentation surface 121P may be formed to provide an aesthetically appealing surface for the ring 100, and may be curved, or may be a substantially flat surface, or may be intricately carved/formed.

Using a substantially flat rectangular surface for the presentation surface 121P that is parallel to the axis of the ring shape may be more advantageous during operation of the ring 100 when being used to open the stay-top 98 of a beverage can 99. The angled surface 121A may be formed adjacent to the substantially flat surface 111F of the leveraging protrusion 111, and may be oriented at an acute angle $\theta$ with respect to the substantially flat surface 111F of the leveraging protrusion 111. Therefore, a v-shaped recess may be formed by the angled surface 121A of the trapping protrusion and by the substantially flat surface 111F of the leveraging protrusion 111, such that it is configured to receive and engage the stay-on tab 98 when the ring 100 is mounted to the finger of the wearer.

Figure 14:
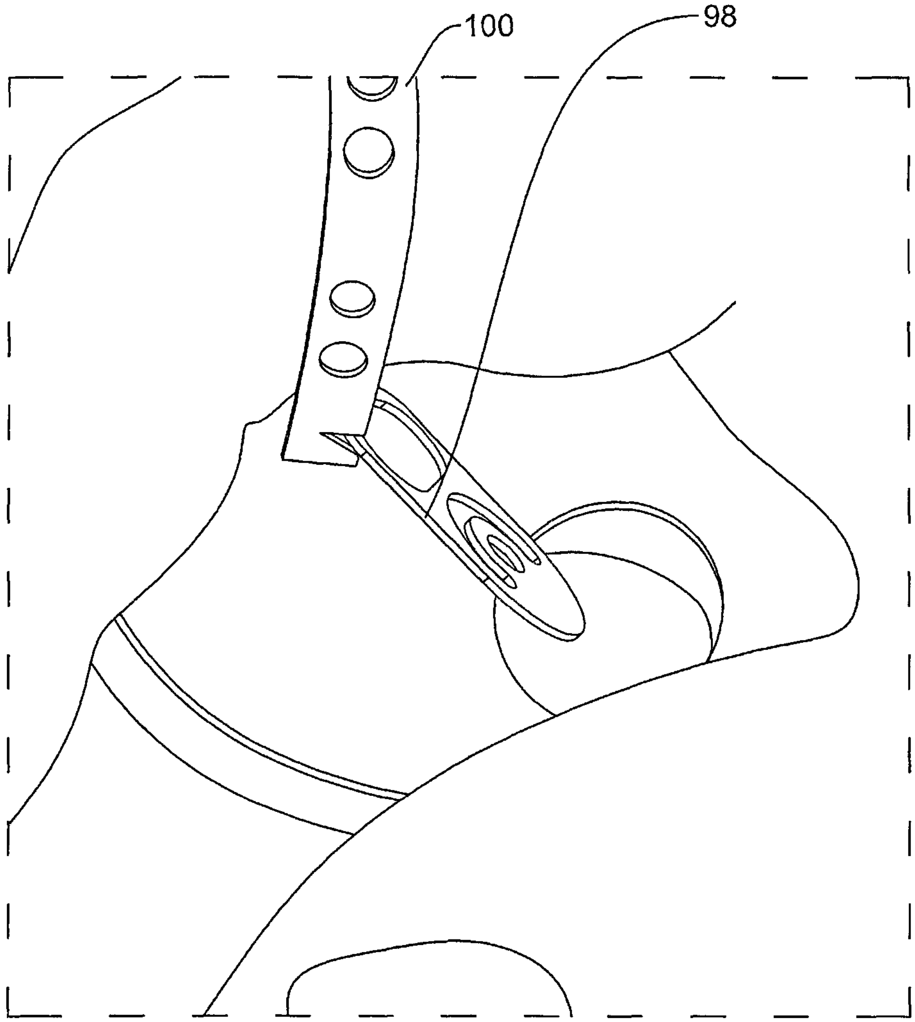
FIG. 14 is the perspective view of FIG. 12, shown after the user moves his/her finger and thus the ring to further move the stay-on tab of a beverage can to permit the fluid contained therein to be consumed.

The leveraging protrusion 111 is configured to protrude sufficiently to locate the substantially flat surface 111F a distance away from the annular outer surface 104 to create leverage that may be used by a wearer, e.g., and elderly user, to flip open the stay-on tab 98. The leveraging protrusion 111 is configured to protrude a distance away from the annular outer surface, as seen in FIG. 14, being in the range of five percent to ten percent of the outer diameter of the annular outer surface of the ring shape, to create suitable leverage in one embodiment, and may be in the range of ten percent to fifteen percent of the outer diameter of the annular outer surface of the ring shape in another embodiment, and may be in the range of fifteen percent to twenty-five percent of the outer diameter of the annular outer surface of the ring shape in another embodiment, and in other embodiments, other ranges or a combination of such ranges may be used.

The ring 100 may be formed of any suitable material that would resist the applied forces, including, but not limited to, a hard wood, plastic (e.g., ABS plastic), a composite material, and a metallic material (e.g., aluminum, titanium, steel, etc.).

FIGS. 15, 16, and 17 are a bottom view, a rear view, and a side view of the beverage can opening ring 100 of FIG. 1, shown with dimensions for a ring size of 13. These dimensions are only meant to be exemplary, and are not to be interpreted as limiting, as other dimensions may alternatively be used for a ring size of 13.

Figure 9C:
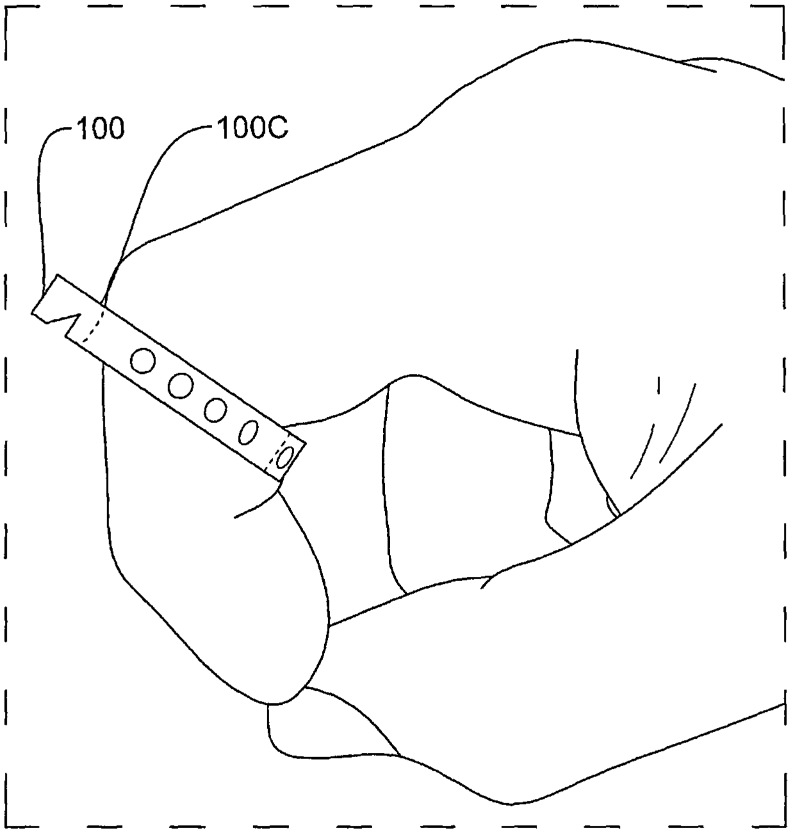
FIG. 9C is a third perspective view showing the beverage can opening ring of FIG. 1 after being mounted on the middle phalange of the index finger of a user, with the finger being curled to help provide attentional leverage.
Figure 10:
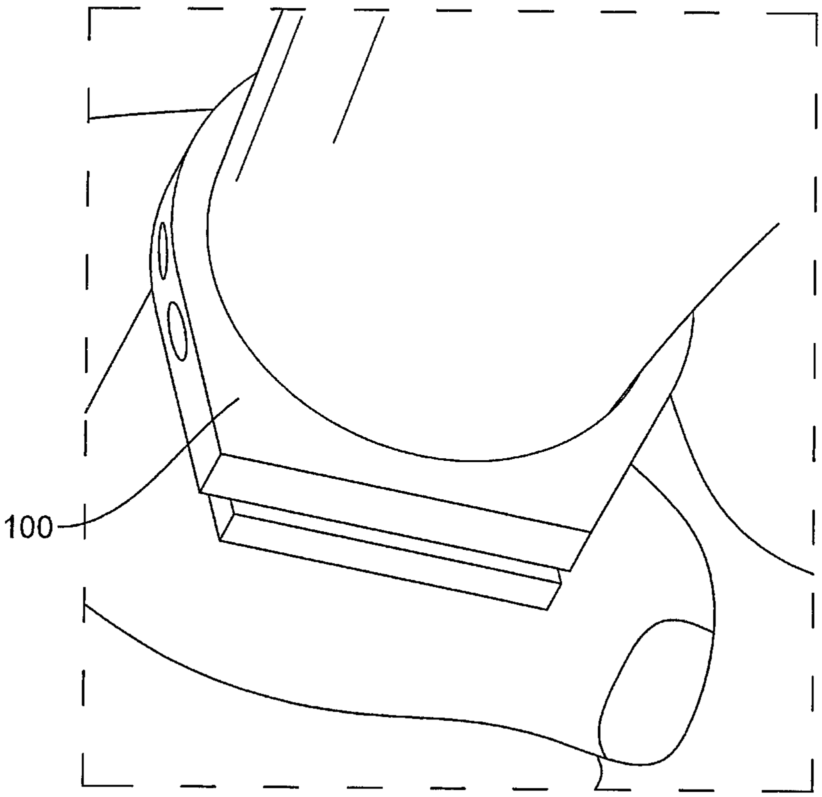
FIG. 10 is a fourth perspective view showing the beverage can opening ring of FIG. 1 after being mounted on the finger of a user.
Figure 11:
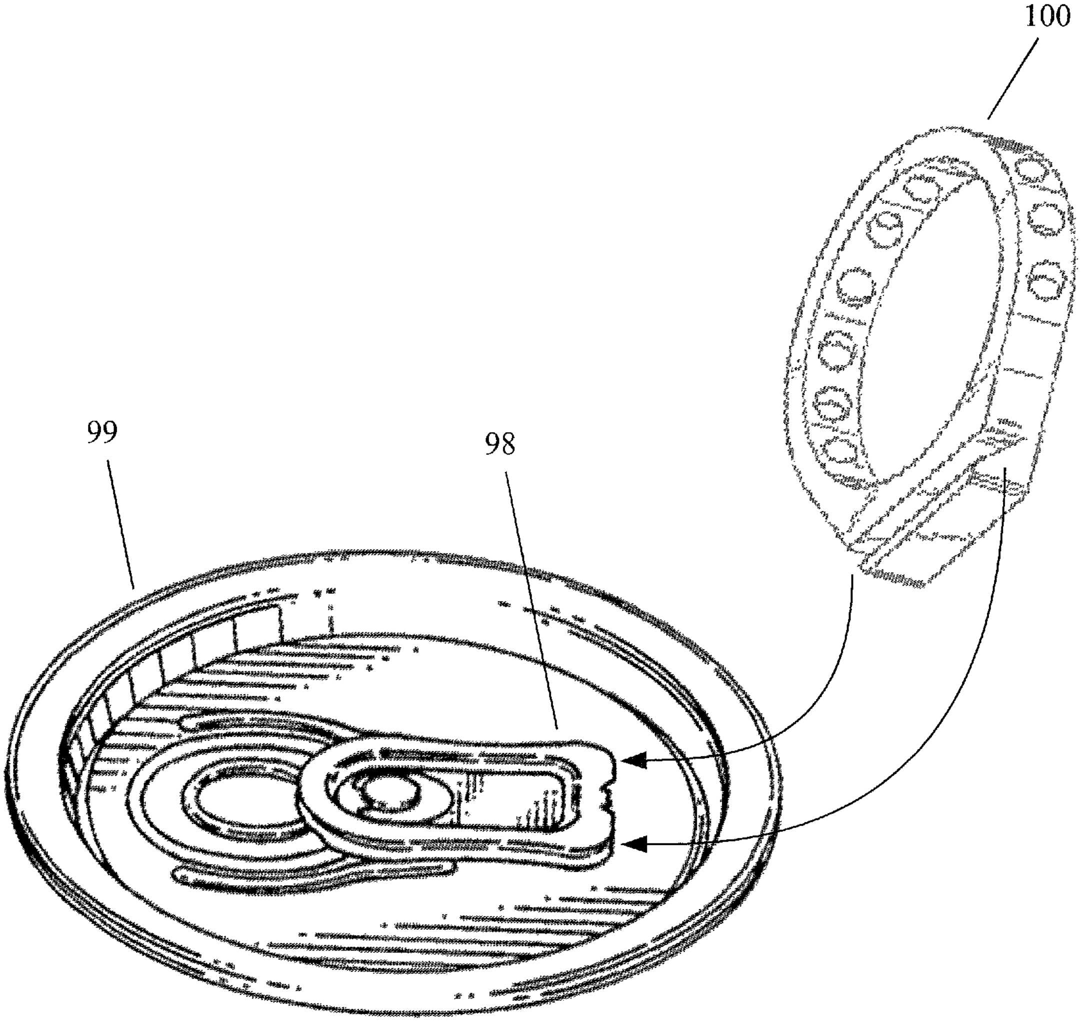
FIG. 11 is a perspective view showing the top portion of a can having a stay-top opening structure, and the beverage can opening ring of FIG. 1, shown just prior to being aligned with, and engaged to, the distal end of the stay-top.
Figure 12:
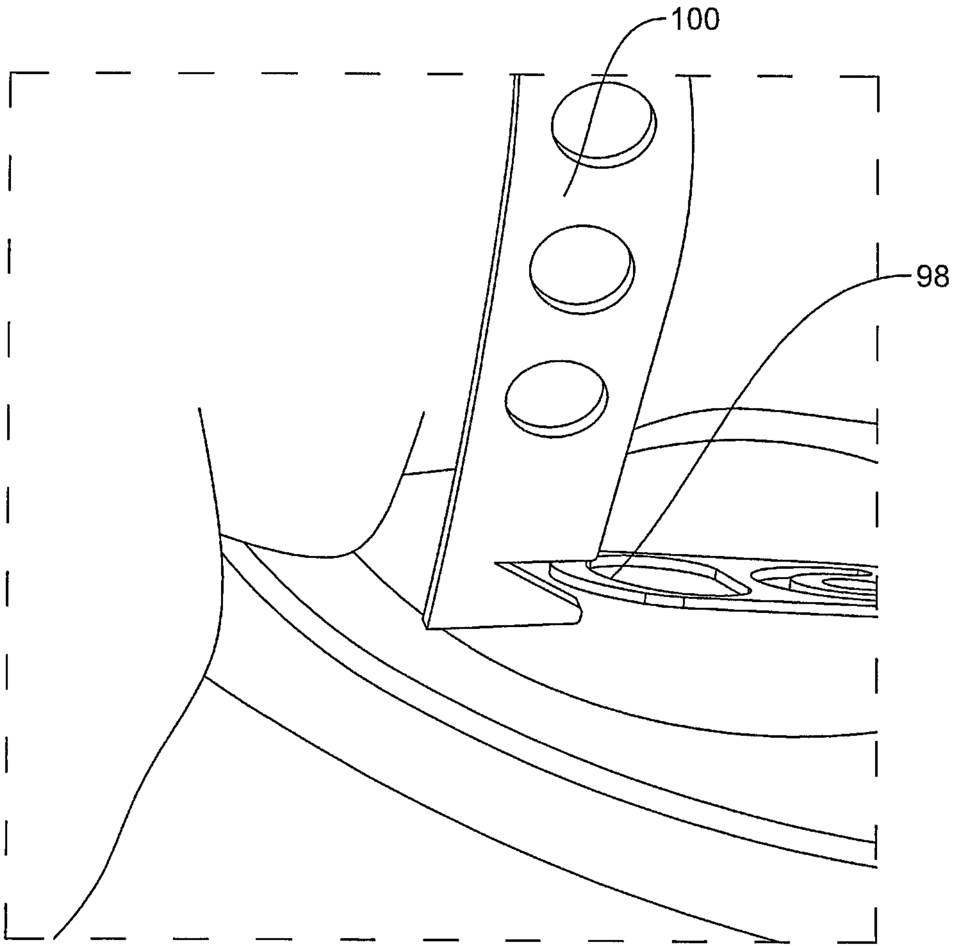
FIG. 12 is a perspective view showing the beverage can opening ring of FIG. 1 mounted on a finger of a user, who positions the recess in the ring to initially engage a stay-top tab of a beverage can.
Figure 13:
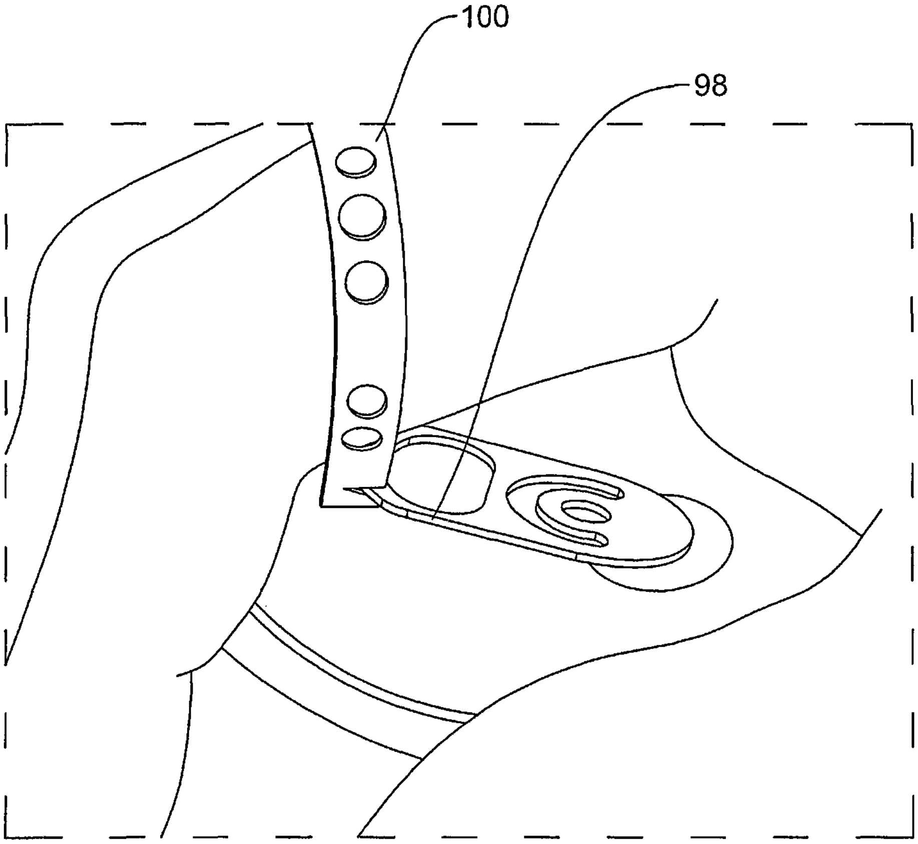
FIG. 13 is the perspective view of FIG. 11, shown after the user moves his/her finger and thus the ring to initially move the stay-on tab of a beverage can to release the pressure in the can.

FIG. 9C is a perspective view showing the beverage can opening ring 100 of FIG. 1 after being mounted on the middle phalange of the index finger of a user, with the finger being curled to help provide attentional leverage, showing another method of use of the ring. The ring 100 may also be positioned to abut against the adjacent synovial hinge joint for added leverage. To better accommodate such positioning on the finger and subsequent actuation by the user, the interior edge of the ring 100 may be beveled locally, and may include the chamfer 100C shown in FIG. 9C.

While illustrative implementations of one or more embodiments of the disclosed ring are provided hereinabove, those skilled in the art and having the benefit of the present disclosure will appreciate that further embodiments may be implemented with various changes within the scope of the disclosed ring. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A ring configured to be worn on a user's finger as jewelry, said ring being further configured as an opener for actuation of a stay-on tab of a beverage can, said ring comprising:

an annular inner surface, and an annular outer surface formed concentric with respect to an axis of said annular inner surface, said annular inner surface and said annular outer surface defining a ring shape;

wherein said ring shape is configured to extend from a first substantially flat surface to a second substantially flat surface;

a leveraging protrusion, said leveraging protrusion configured to protrude from said annular outer surface of said ring shape in a direction being away from said axis, and being configured to terminate in a substantially flat rectangular surface, said substantially flat rectangular surface being parallel to said axis;

a trapping protrusion, said trapping protrusion configured to protrude away from a portion of said leveraging protrusion along a length of a long edge of said substantially flat rectangular surface and to extend between said first substantially flat surface and said second substantially flat surface, said trapping protrusion comprising: an angled surface and a presentation surface; said presentation surface formed parallel to said axis and configured to provide an aesthetic surface for said ring; said angled surface formed adjacent to said substantially flat rectangular surface of said leveraging protrusion and oriented at an acute angle (Ø) with respect to said substantially flat rectangular surface of said leveraging protrusion, thereby forming a v-shaped recess in said first substantially flat surface, said angled surface being thereby configured to only extend from said first substantially flat surface part way to said second substantially flat surface;

wherein an axial direction of said v-shaped recess is perpendicular to said axis of said annular inner surface;

wherein said v-shaped recess formed by said angled surface of said trapping protrusion and by said substantially flat rectangular surface of said leveraging protrusion is formed at said angle (Ø) being about 30 degrees and is thereby configured to receive and engage the stay-on tab; and wherein said leveraging protrusion is configured to protrude a distance away from said outer surface to create leverage to flip open the stay-on tab.

2. The ring of claim 1, wherein said leveraging protrusion is configured to protrude a distance away from said outer surface in the range of fifteen percent to twenty percent of an outer diameter of said annular outer surface of said ring shape to create the leverage.

3. The ring of claim 1, wherein said trapping protrusion is configured to protrude about 3 mm from said substantially flat rectangular surface of said leveraging protrusion;

wherein a depth of said v-shaped recess from said first substantially flat surface is about 3.46 mm; and wherein an edge of said v-shaped recess formed by said angled surface of said trapping protrusion at said first substantially flat surface is about 1 mm from said display surface.

* * * * *